(12) United States Patent
Carroll

(10) Patent No.: US 10,155,612 B2
(45) Date of Patent: Dec. 18, 2018

(54) METHOD OF MANUFACTURING A SEASONING BAG

(71) Applicant: FLAVORSEAL LLC, Avon, OH (US)

(72) Inventor: Chris Carroll, Westlake, OH (US)

(73) Assignee: Flavorseal LLC, Avon, OH (US)

( * ) Notice: Subject to any disclaimer, the term of this patent is extended or adjusted under 35 U.S.C. 154(b) by 0 days.

(21) Appl. No.: 15/899,758

(22) Filed: Feb. 20, 2018

(65) Prior Publication Data

US 2018/0170637 A1    Jun. 21, 2018

Related U.S. Application Data

(63) Continuation of application No. 15/645,260, filed on Jul. 10, 2017, now abandoned, which is a
(Continued)

(51) Int. Cl.
*B65B 31/02* (2006.01)
*B65D 65/46* (2006.01)
(Continued)

(52) U.S. Cl.
CPC ............ *B65D 65/463* (2013.01); *A23L 27/70* (2016.08); *B65B 25/001* (2013.01); *B65B 25/22* (2013.01); *B65B 29/06* (2013.01); *B65B 29/08* (2013.01); *B65B 31/024* (2013.01); *B65D 33/002* (2013.01); *B65D 81/2023* (2013.01);
(Continued)

(58) Field of Classification Search
CPC .... B65D 65/463; B65D 25/22; B65D 33/002; B65D 25/001; B65D 25/04–25/25; B65D 29/08; B65D 29/06; B65D 2081/008; B65D 81/20–81/2007; B65D 81/2023–81/28; B65D 81/34–81/3446; B65D 81/3461–81/3469; B65D 85/816; B65D 2581/34–2581/3483; A23L 27/70; A23L 5/15; A23L 5/40–5/49; B65B 25/001; B65B 25/041; B65B 25/06–25/068; B65B 29/06; B65B 29/08; B65B 31/02–31/024; A23V 2002/00
USPC ........ 426/104, 112–115, 129, 420, 394, 413; 53/459
See application file for complete search history.

(56) References Cited

U.S. PATENT DOCUMENTS 2,592,081 A    4/1952  Toulmin, Jr.
2,833,094 A    5/1958  Arlington
(Continued)

FOREIGN PATENT DOCUMENTS

CA    2135416    5/1996

OTHER PUBLICATIONS

Oxford English Dictionary, "sauce", http://www.oed.com/viewdictionaryentry/Entry/171316.
(Continued)

*Primary Examiner* — Drew E Becker
(74) *Attorney, Agent, or Firm* — Calfee, Halter & Griswold LLP

(57) ABSTRACT

In a method for manufacturing a seasoning bag, an edible adhesive is applied to a panel of a bag in a pattern of spaced apart lines. A granular seasoning is applied to the panel of the bag such that the granular seasoning adheres to the edible adhesive pattern to produce a seasoning layer having a pattern substantially the same as the edible adhesive pattern.

17 Claims, 4 Drawing Sheets

Related U.S. Application Data continuation of application No. 14/951,659, filed on Nov. 25, 2015, now abandoned, which is a continuation of application No. 13/303,358, filed on Nov. 23, 2011, now abandoned.

(60) Provisional application No. 61/416,510, filed on Nov. 23, 2010.

(51) Int. Cl.

| | | |
|---|---|---|
| *B65D 81/34* | (2006.01) | |
| *B65B 29/08* | (2006.01) | |
| *B65D 81/20* | (2006.01) | |
| *B65B 25/00* | (2006.01) | |
| *B65D 81/28* | (2006.01) | |
| *B65B 29/06* | (2006.01) | |
| *B65D 85/816* | (2006.01) | |
| *B65D 33/00* | (2006.01) | |
| *B65B 25/22* | (2006.01) | |
| *A23L 27/00* | (2016.01) | |
| *B65D 81/00* | (2006.01) | |

(52) U.S. Cl.
CPC ......... *B65D 81/2038* (2013.01); *B65D 81/28* (2013.01); *B65D 81/34* (2013.01); *B65D 81/343* (2013.01); *B65D 81/3415* (2013.01); *B65D 81/3461* (2013.01); *B65D 85/816* (2013.01); *A23V 2002/00* (2013.01); *B65D 2081/008* (2013.01); *B65D 2581/3416* (2013.01)

(56) References Cited

U.S. PATENT DOCUMENTS

| | | | | |
|---|---|---|---|---|
| 2,902,371 | A | 9/1959 | Shorr | |
| 3,042,532 | A * | 7/1962 | Gordon | A47J 36/022 426/132 |
| 3,323,442 | A | 6/1967 | Sandt | |
| 3,468,102 | A | 9/1969 | Farrar | |
| 3,596,428 | A * | 8/1971 | Young | B65B 9/023 426/138 |
| 3,821,436 | A | 6/1974 | Fry | |
| 3,864,503 | A | 2/1975 | Steenoisen | |
| 3,881,023 | A | 4/1975 | Wilson | |
| 4,260,637 | A | 4/1981 | Rispoli | |
| 4,356,202 | A | 10/1982 | Todd | |
| 4,398,077 | A | 8/1983 | Freedman | |
| 4,446,167 | A | 5/1984 | Smith et al. | |
| 4,478,858 | A | 10/1984 | Baird | |
| 4,496,601 | A | 1/1985 | Rispoli | |
| 4,756,422 | A * | 7/1988 | Kristen | B65D 31/02 206/524.8 |
| 5,021,252 | A * | 6/1991 | Huang | A22C 13/0003 206/802 |
| 5,038,009 | A | 8/1991 | Babbit | |
| 5,274,984 | A * | 1/1994 | Fukuda | B65B 9/20 242/559.3 |
| 5,705,214 | A * | 1/1998 | Ito | A22C 13/0013 426/105 |
| 5,741,533 | A | 4/1998 | Lorenzo Moore et al. | |
| 5,858,426 | A | 1/1999 | Bienvenu | |
| 5,863,578 | A | 1/1999 | Guarino | |
| 5,914,142 | A | 6/1999 | Zartner | |
| 5,921,252 | A | 7/1999 | Chubb | |
| 6,117,464 | A | 9/2000 | Moore et al. | |
| 6,153,232 | A | 11/2000 | Holten et al. | |
| 6,195,966 | B1 * | 3/2001 | Shomron | B31D 5/0073 53/451 |
| 6,299,917 | B1 | 10/2001 | Appleby | |
| 6,444,246 | B1 | 9/2002 | Popplewell et al. | |
| 6,623,773 | B2 * | 9/2003 | Meier | A23B 4/12 426/112 |
| 6,667,082 | B2 | 12/2003 | Bamore et al. | |
| 6,799,680 | B2 * | 10/2004 | Mak | B65D 65/406 206/524.8 |
| 6,884,446 | B1 | 4/2005 | Underwood et al. | |
| 7,282,229 | B2 | 10/2007 | Underwood et al. | |
| 7,665,896 | B1 * | 2/2010 | Higgs | B32B 3/28 206/524.8 |
| 8,461,449 | B2 | 6/2013 | Dorsey | |
| 2003/0031765 | A1 * | 2/2003 | Luthra | A22C 13/0013 426/129 |
| 2003/0054075 | A1 | 3/2003 | Dinh-Sybeldon et al. | |
| 2003/0057206 | A1 | 3/2003 | Ishii | |
| 2005/0147330 | A1 * | 7/2005 | Lee | B29C 43/222 383/116 |
| 2005/0163894 | A1 | 7/2005 | Underwood et al. | |
| 2005/0286817 | A1 * | 12/2005 | Hall | B65D 31/02 383/109 |
| 2006/0051465 | A1 | 3/2006 | Kyle et al. | |
| 2006/0072860 | A1 * | 4/2006 | Wu | B29C 47/0021 383/101 |
| 2006/0127538 | A1 | 6/2006 | Appleby | |
| 2006/0159806 | A1 | 7/2006 | Darin et al. | |
| 2006/0172096 | A1 | 8/2006 | Kyle et al. | |
| 2006/0198960 | A1 | 9/2006 | Calvert et al. | |
| 2008/0137996 | A1 * | 6/2008 | Ping | B65D 81/2038 383/100 |
| 2008/0190999 | A1 | 8/2008 | Tomasini et al. | |
| 2008/0199592 | A1 | 8/2008 | Fexer | |
| 2008/0226202 | A1 * | 9/2008 | Dais | B65D 81/2023 383/63 |
| 2008/0264821 | A1 * | 10/2008 | Liang | B65D 81/2038 206/524.8 |
| 2008/0310776 | A1 * | 12/2008 | Turvey | B65D 33/01 383/105 |
| 2009/0110787 | A1 | 4/2009 | Kyle et al. | |
| 2009/0202681 | A1 | 8/2009 | Areso | |
| 2009/0220655 | A1 * | 9/2009 | Longo Areso | A22C 13/00 426/105 |
| 2009/0274799 | A1 * | 11/2009 | Lee | A21C 9/04 426/107 |
| 2011/0262603 | A1 | 10/2011 | Blattner | |
| 2013/0011529 | A1 | 1/2013 | Belzowski | |
| 2013/0129875 | A1 | 5/2013 | Krauch | |
| 2014/0199001 | A1 * | 7/2014 | Haluck | B65D 81/203 383/109 |

OTHER PUBLICATIONS

Non-Final Office Action for U.S. Appl. No. 13/303,358 dated Jul. 30, 2014.
Response to Office Action for U.S. Appl. No. 13/303,358 dated Jan. 30, 2015.
Notice Regarding Non-Compliant or Non-Responsive Amendment in U.S. Appl. No. 13/303,358 dated Feb. 10, 2015.
Response to Notice Regarding Non-Compliant or Non-Responsive Amendment in U.S. Appl. No. 13/303,358 dated Mar. 10, 2015.
Final Rejection in U.S. Appl. No. 13/303,358 dated May 8, 2015.
RCE and Response to Final Rejection filed in U.S. Appl. No. 13/303,358 dated Aug. 10, 2015.
Non-Final Office Action in U.S. Appl. No. 13/303,358 dated Sep. 2, 2015.
Non-Final Office Action in U.S. Appl. No. 14/951,659 dated Apr. 1, 2016.
Response to Office Action for U.S. Appl. No. 14/951,659 dated Sep. 1, 2016.
Non-Final Office Action in U.S. Appl. No. 14/951,659 dated Sep. 16, 2016.
Response to Office Action for U.S. Appl. No. 14/951,659 dated Jan. 17, 2017.
Final Office Action in U.S. Appl. No. 14/951,659 dated Feb. 8, 2017.
Response to Final Office Action for U.S. Appl. No. 14/951,659 dated May 3, 2017.
Applicant-Initiated Interview Summary for U.S. Appl. No. 14/951,659 dated May 10, 2017.

(56) References Cited

OTHER PUBLICATIONS

Advisory Action for U.S. Appl. No. 14/951,659 dated May 11, 2017.
Office Action for U.S. Appl. No. 15/645,260 dated Nov. 20, 2017.
Response to Office Action dated Aug. 10, 2017 for U.S. Appl. No. 15/645,260.
Office Action for U.S. Appl. No. 15/645,260 dated Aug. 10, 2017.

* cited by examiner

METHOD OF MANUFACTURING A SEASONING BAG

RELATED APPLICATION DATA

This application is a continuation of U.S. Non-Provisional patent application Ser. No. 15/645,260, filed on Jul. 10, 2017 and titled PRE-COATED SEASONING BAGS, now abandoned, which is a continuation of U.S. Non-Provisional patent application Ser. No. 14/951,659, filed on Nov. 25, 2015 and titled PRE-COATED SEASONING BAGS, now abandoned, which is a continuation of U.S. Non-Provisional patent application Ser. No. 13/303,358, filed on Nov. 23, 2011 and titled PRE-COATED SEASONING BAGS, now abandoned, which claims the benefit of U.S. Provisional Patent Application No. 61/416,510 filed Nov. 23, 2010 and titled PRE-COATED SEASONING BAGS, the entire disclosures of each of which are incorporated by reference in their entirety.

TECHNICAL FIELD

The present application relates generally to seasoning bags for foodstuffs, and in particular to seasoning bags including one or more seasonings adhered to the interior of the bag for use in the preparation, storage, and/or cooking of foodstuffs.

BACKGROUND

Seasoning such as spices and marinades are typically used to impart a desired taste to foodstuffs. In general, seasonings are combined in given quantities and applied to foodstuffs prior to cooking. For example, spices may be coated, tumbled, or dry-rubbed on a piece of meat, or a piece of meat may be bathed in a liquid marinade. But such processes require considerable preparation time and often necessitate the purchase of a larger quantity of seasonings than is needed. Furthermore, the inherent inconsistencies associated with the ad hoc application of seasonings to foodstuffs (e.g., the addition of differing amounts of a seasoning or the use of different brands of the same type of a seasoning) results in the decreased repeatability of the finished food product.

In addition, conventional seasoning application processes can result in a significant waste of seasonings throughout the preparation process. This "seasoning loss" occurs when an excess amount of seasoning is applied during food preparation and therefore is not completely utilized. For example, excess spices that are used during a coating, tumbling, or dry-rub process may not contact and/or adhere to the foodstuff during preparation. Furthermore, excess liquid marinade may be required to fill a container in which a piece of meat is bathed. These unutilized excess seasonings are simply discarded after the preparation process.

SUMMARY OF INVENTION

The subject matter of the present application provides a pre-coated seasoning bag used in connection with the preparation, storage, and/or cooking of a foodstuff, wherein one or more seasonings are pre-coated on the interior of the bag for imparting a flavor to the foodstuff. The pre-coated seasoning bag provides for a one-step application process that affords consistent seasoning coverage of the foodstuff while yielding a consistently flavored food product. Use of the pre-coated seasoning bag eliminates the need to purchase individual seasonings in more-than-needed quantities, while minimizing "seasoning loss" throughout the food preparation process. In addition, the seasoning of the pre-coated seasoning bag may be used in combination with a liquid added to the seasoning bag and/or the moisture (or purge) emitted from the foodstuff upon cooking to yield a broth or a sauce for consumption with the food product. According to one aspect of the disclosure, a seasoning bag for seasoning a foodstuff includes: an edible adhesive adhered to an interior of the seasoning bag; and a seasoning adhered to the interior of the seasoning bag via the edible adhesive.

According to one embodiment, the seasoning is brought into contact with the foodstuff upon insertion of the foodstuff into the seasoning bag.

According to another embodiment, the seasoning is combinable with liquid added to the seasoning bag to form a liquid marinade.

According to another embodiment, an end of the seasoning bag is closable to the atmosphere.

According to another embodiment, the seasoning bag is vacuum sealable. According to another embodiment, the seasoning allows for air egress from the seasoning bag.

According to another embodiment, the seasoning bag is a cook-in bag.

According to another embodiment, the seasoning is combinable with liquid added to the seasoning bag to form a broth or a sauce. According to another embodiment, the seasoning is combinable with purge from the foodstuff to form a broth or a sauce. According to another embodiment, the broth or the sauce is one of a stock, a gravy, an au jus, or a cheese sauce. According to another embodiment, the seasoning bag is at least one of an ovenable bag, a boilable bag, a slow cooking bag, or a microwavable bag.

According to another embodiment, the edible adhesive is applied as at least one of a continuous layer, predetermined pattern, or random pattern.

According to another embodiment, the seasoning includes at least one of a coloring additive, a nutrient, an antimicrobial additive, or a preservative. According to another aspect of the disclosure, a method of seasoning a foodstuff includes: inserting a foodstuff into a seasoning bag, the seasoning bag including: an edible adhesive adhered to an interior of the seasoning bag; and a seasoning adhered to the interior of the seasoning bag via the edible adhesive.

According to one embodiment, the method further includes marinating the foodstuff in the seasoning bag. According to another embodiment, the method further includes combining the seasoning with a liquid to form a liquid marinade.

According to another embodiment, the method further includes vacuum sealing the seasoning bag.

According to another embodiment, the method further includes cooking the foodstuff while the foodstuff is in the seasoning bag. According to another embodiment, the step of cooking includes at least one baking, boiling, slow cooking, or microwaving. According to another embodiment, the method further includes combining the seasoning with liquid added to the seasoning bag to form a broth or a sauce. According to another embodiment, the method further includes combining the seasoning with purge from the foodstuff to form a broth or a sauce. According to another embodiment, the broth or the sauce is one of a stock, a gravy, an au jus, and a cheese sauce.

The foregoing and other features of the invention are hereinafter described in greater detail with reference to the accompanying drawings.

DESCRIPTION

Figure 1:
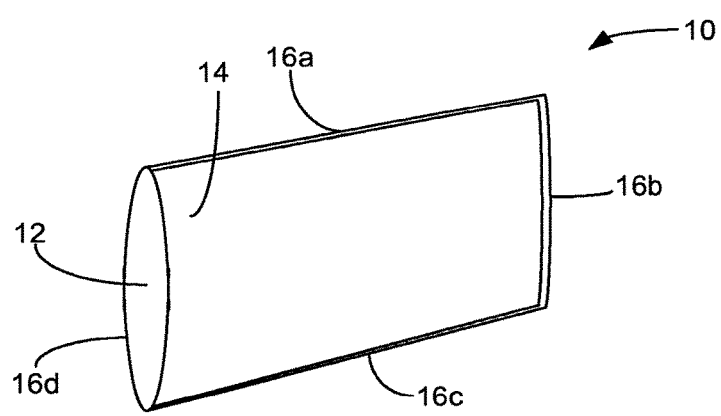
FIG. 1 is a schematic diagram of an exemplary pre-coated seasoning bag in accordance with the subject matter of the present application.

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Referring now in detail to the drawings and initially to FIG. 1, a pre-coated seasoning bag in accordance with the subject matter of the present application is shown generally at 10. The seasoning bag 10 may be used in connection with the preparation of a foodstuff, in which case the bag may be used to coat and/or marinate a foodstuff with seasoning. As used herein, the term "foodstuff" may be any substance that can be used or prepared for use as a food. In one embodiment, the foodstuff is protein-based, such as a piece of fish or meat (e.g., turkey, chicken, beef, pork, etc. In another embodiment, the foodstuff may be a vegetable, such as broccoli, carrots, brussel sprouts, corn, etc. In other embodiments, the foodstuff may be one or more other products, such as grains and nuts, or may be a combination of types of foods.

The seasoning bag may also be used for storing a foodstuff (e.g., refrigeration, freezing, etc.) for a desired amount of time. Further still, the formed seasoning bag 10 may be used in connection with cooking a foodstuff. During cooking, the bag functions to hold liquid added to the seasoning bag and/or entrap the seasoning and moisture (purge) expelled from the foodstuff. The specific implementations of the seasoning bag 10 as a preparation bag, storage bag, and/or cook-in bag are described in more detail below.

The seasoning bag 10 encloses the foodstuff, and in some embodiments (e.g., a vacuum sealed bag), takes on the form of the foodstuff enclosed therein. As such, the seasoning bag 10 is different from a casing. Casings are typically used to press-form a foodstuff so that the foodstuff takes on the shape of the casing (e.g., a log or tubular shape) and retains that shape after curing and/or cooking. By contrast, a foodstuff that is prepared and/or cooked in the seasoning bag 10 generally retains its original shape.

The pre-coated seasoning bag 10 includes two panels 12 and 14 that are joined on three sides and open on a fourth side for receiving foodstuffs. The panels 12 and 14 are constructed from one or more continuous rolls of sheet stocks of film, such as that illustrated in FIG. 2. The one or more sheet stocks 18 may be joined and cut to length. In one embodiment, the panels 12 and 14 are formed from a single sheet stock 18 of film that is folded upon itself along end portion 16a and joined at end portions 16b and 16c. In another embodiment, the panels 12 and 14 are formed from two separate sheet stocks 18 of film that are overlaid and joined at end portions 16a-c.

Figure 2:
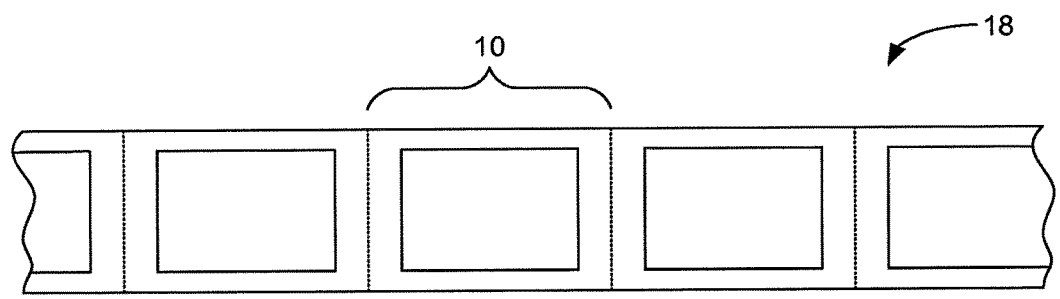
FIG. 2 is a schematic diagram of an exemplary sheet stock of film in accordance with the subject matter of the present application.
Figure 3:
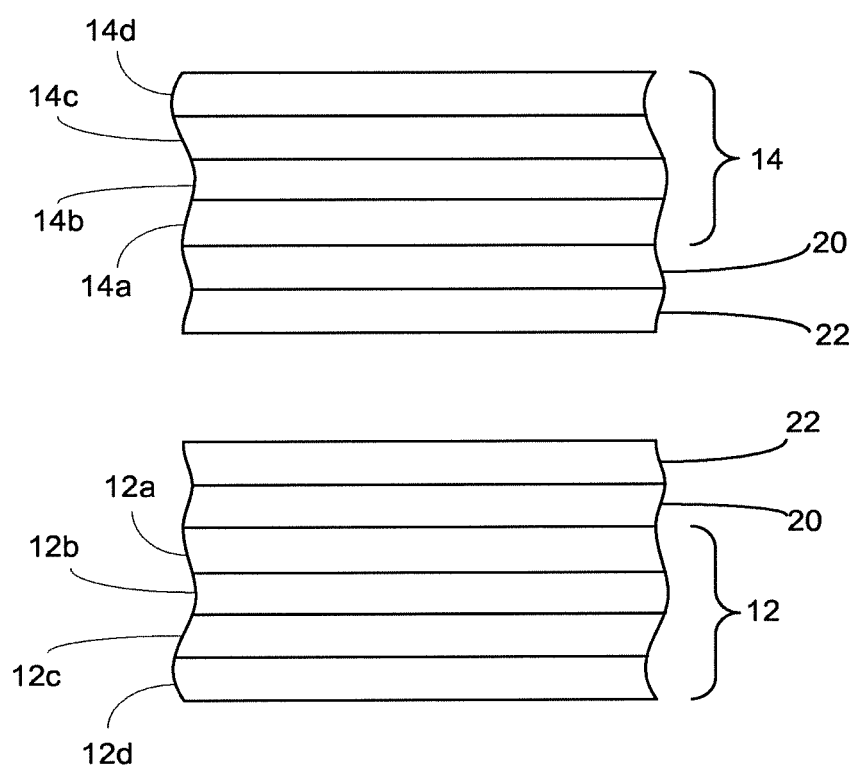
FIG. 3 is a cross-sectional view of the panels of an exemplary pre-coated flavoring bag in accordance with the subject matter of the present application.
Figure 4A:
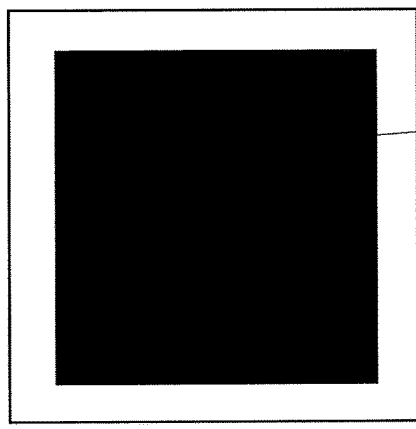
FIGS. 4a-f are schematic diagrams of exemplary patterns of applied adhesive in accordance with the subject matter of the present application.
Figure 4B:
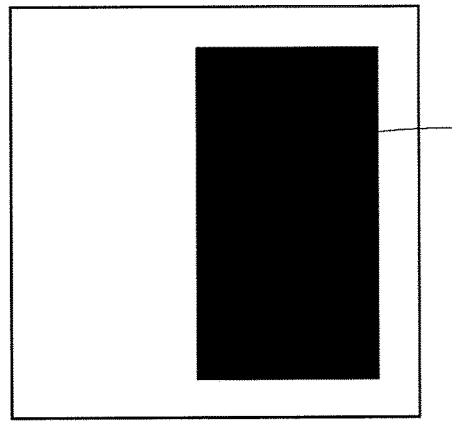
Figure 4C:
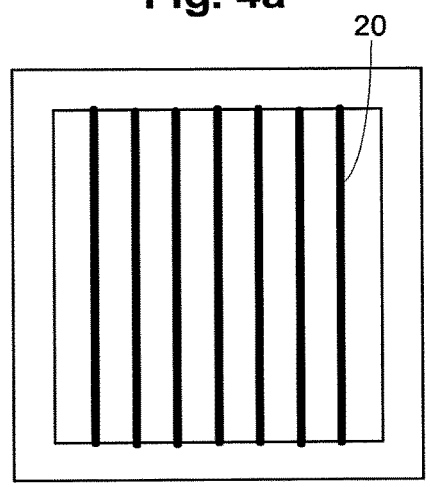
Figure 4D:
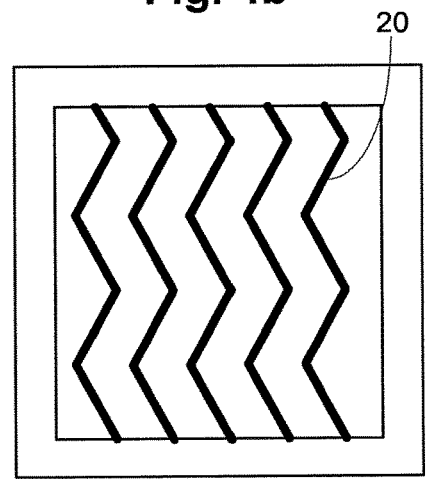
Figure 4E:
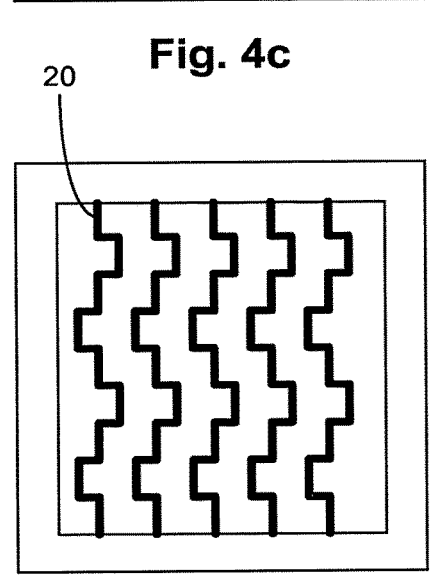
Figure 4F:
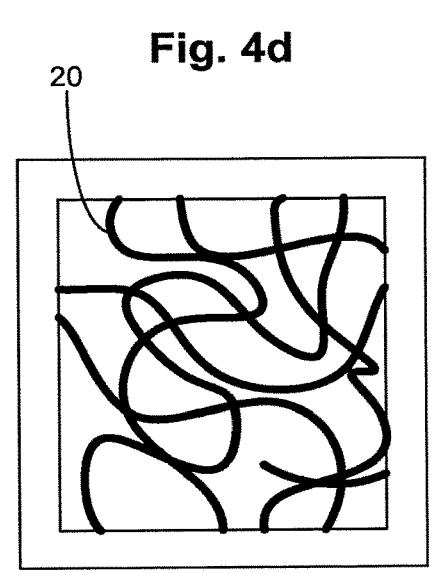

The panels 12 and 14 may be constructed from any materials suitable for use in connection with the preparation and/or cooking of foodstuffs. For example, the panels 12 and 14 may be constructed from one or more film materials that are capable of withstanding prolonged cold (e.g., during storage) and/or heat (e.g., during cooking). The panels 12 and 14 may also be constructed from one or more materials capable of maintaining a vacuum applied to the seasoning bag 10 via a vacuum-seal process. In other embodiments, the panels 12 and 14 may be constructed from one or more other materials, such as parchment paper, wax paper, foil, films (non-shrink, ovenable, non-cook-in, saran, channeled film, etc.), fibrous paper (e.g., pulp based material), etc. Of course, one panel may be constructed of a material that is different than the material of the other panel. The panels 12 and 14 may be constructed from a single layer of film or a multiple layer of film that has been laminated, coextruded, or extrusion-coated to form a single film such that the outer layer, the inner layer, and any intermediate layers are joined together over the entire adjacent surface of the panel. FIG. 3 provides a cross-sectional view of exemplary panels 12 and 14, which are each constructed from four film layers. In the exemplary embodiment, the inner-most layer 12a, 14a of each panel that defines the inner surface of the bag is constructed of a linear low-density polyethylene (LLDPE) blend, the two intermediate layers 12b, 12c, 14b, 14c are each respectively constructed of nylon, and the outer-most layer 12d, 14d that defines the outer surface of the seasoning bag is constructed of LLDPE. An example of a commercially available film similar to that described in relation to FIG. 2 is APEX 9616 VF, available from Ampac Packaging, LLC, 12025 Tricon Road, Cincinnati, Ohio 45246. Of course, one panel may be constructed of different layers than the other panel.

While the panels 12 and 14 of the seasoning bag 10 have generally been described in the context of FIG. 3, it is to be understood that the particular structure and material of the panels 12 and 14 is not germane to the invention in its broadest sense. For example, another commercially available film that is suitable for use in the present application is Kenylon 6475, a nylon film available from KNF Flexpak Corporation, 734 West Penn Pike, Suite 1, Tamaqua, Pa. 18252.

A layer of edible adhesive 20 is applied to the inner side of at least one of the panels 12 and 14 such that the edible adhesive 20 is located on the interior of the seasoning bag 10. The edible adhesive 20 may be, for example, a sugar-based carbohydrate glue. With continuing reference to FIG. 2, the edible adhesive 20 may be applied to the one or more sheet stocks 18 of film from which the seasoning bag 10 is constructed, prior to formation of the seasoning bag 10. For example, the edible adhesive 20 may sprayed or rolled onto a designated area of the sheet stock 18. In this embodiment, the edible adhesive 20 is not applied to those portions of the sheet stock 18 that form the end and edge portions of the seasoning bag 10. This area in which the adhesive is not applied may vary depending on the necessary area for forming the seasoning bag.

With additional reference to FIGS. 4a-e, the edible adhesive 20 may be applied in the designated area as a continuous film (e.g., FIGS. 4a and 4b) or in a predetermined or random pattern (e.g., FIGS. 4c-4f). FIGS. 4c-4f illustrate that patterns may include, for example, straight lines that may resemble grill marks, an angled zig-zag or crenate pattern, a square zig-zag or crenellated pattern, a random pattern, etc.

A layer of seasoning 22 is adhered to the inner side of at least one of the panels 12 and 14 via the edible adhesive 20 such that the seasoning 22 is also disposed in the interior of the seasoning bag 10. The term "seasoning" may be any substance or blend of substances used to impart a flavor to a foodstuff and/or used for consumption with a foodstuff. The seasoning may be in any suitable form (e.g., granular, powder, dehydrated, liquid, etc.). Various embodiments of seasonings are described below.

The seasoning 22 may be adhered to at least one of the panels via the edible adhesive 20 prior to formation of the seasoning bag 10. For example, the seasoning 22 may be sprayed, sprinkled, or blown onto the edible adhesive 20 formed on the sheet stock 18. Contact with the edible adhesive 20 will retain the seasoning 22 on the sheet stock 18, and the pattern of the resultant layer of seasoning 22 will therefore be substantially the same as the pattern of the layer of edible adhesive 20. Hence, the seasoning 22 may be applied as a continuous film or in a predetermined pattern or random pattern, similar to FIGS. 4a-f.

The specific seasonings 22 used in the seasoning layer may vary in type, amount, and size. Examples of recipes that include various types and amounts of seasonings are provided below. The size of the seasoning 22 will vary depending on the type of seasoning used, and may be in granule form. For example, a seasoning 22 such as crushed pepper may range in granule size from 10 mesh to 30 mesh. Other seasonings 22 may range in granule size from about 5 mesh to about 100 mesh. In one embodiment, about 95% of the seasonings 22 used in the seasoning layer has a granule size that is larger than about 80 mesh, and about 5% of the seasoning 22 has a granule size that is larger than about 8 mesh. In another embodiment, about 20% of the seasoning 22 used in the seasoning layer has a granule size that is smaller than about 100 mesh, about 75% of the seasoning 22 has a granule size that is larger than about 80 mesh, and about 5% of the seasoning 22 has a granule size that is larger than about 8 mesh.

The ratio of applied edible adhesive 20 to seasoning 22 also varies depending on the type and amount of seasoning that is to be applied to the interior of the bag. In one embodiment, the amount of edible adhesive 20 relative to the amount of seasoning 22 may range from about 6% by weight to about 66% by weight. For example, the edible adhesive 20 may be applied in an amount ranging from about 25 mg per square inch to about 100 mg per square inch, while the seasoning 22 may be applied in an amount ranging from about 25 mg per square inch to about 450 mg per square inch. Furthermore, the thickness of the layer of edible adhesive 20 and the layer of seasoning 22 may vary depending on the type and amount of seasoning that is to be applied. For example, the thickness of the adhesive layer may range from about 3 mil to about 18 mil and the thickness of the seasoning layer may range from about 3 mil to about 18 mil.

As described above, the layers of edible adhesive 20 and seasoning 22 may be separate, and upon application, the granules of the seasoning layer may be at least partially embedded in the adhesive layer. In an alternative embodiment, the edible adhesive 20 may be mixed with the seasoning 22 prior to application so that the edible adhesive 20 and seasoning 22 are applied as a single combined layer in a one-step application process. This combined layer may be applied as a continuous film, predetermined pattern, or random pattern, consistent with that which is described above.

One or more additives may also be combined with the seasoning 22 and/or with the adhesive 20. In one embodiment, a colorant may be included for imparting a desired aesthetic look to the foodstuff. For example, a colorant may impart a "browned" look to a piece of meat. Furthermore, when the adhesive and seasoning layer are provided in a pattern, the added colorant may impart the pattern on the foodstuff (e.g., "char-grilled" marks on a piece of meat). Other additives such as nutrients, antimicrobial additives, and preservatives may also be combined with the seasoning 22 and/or with the adhesive 20.

With continued reference to FIG. 1, the open end portion 16d of the seasoning bag 10 may be closable by any suitable means such that the interior of the flavoring bag may be isolated from the atmosphere, e.g., following insertion of a foodstuff into the seasoning bag. In one embodiment, the end portion 16d of the bag may be closed by heat sealing. The heat sealing may be performed in conjunction with a vacuum sealing process, in which case air channels formed by the granules of the seasoning layer, and/or the patterns of adhesive and/or seasoning may assist in the egress of air from the bag. In alternative embodiments, end portion 16d may include a zipper mechanism or similar means for closing the seasoning bag 10.

The bag may also include one or more vents (not illustrated) for venting expanding gasses and water vapor from the closed seasoning bag 10 as a result of the cooking process. The vents may be embodied as one or more holes, slits and/or perforations in the bag that will split open upon an increase in pressure from inside the closed bag.

In other embodiments, the seasoning bag 10 may be configured such that the open end is configured to remain open following insertion of a foodstuff into the seasoning bag. In an example, the seasoning bag 10 may function as a liner of a slow cooker. In this embodiment, seasoning is located on an interior of the bag distal the open end, which is the portion of the bag that will be located for heating and holding foodstuff during slow cooking. This type of seasoning bag may be made using the adhesive application shown in FIG. 4b, for example. As a result, seasoning is not located in an upper portion of the bag proximal the open end.

Figure 5:
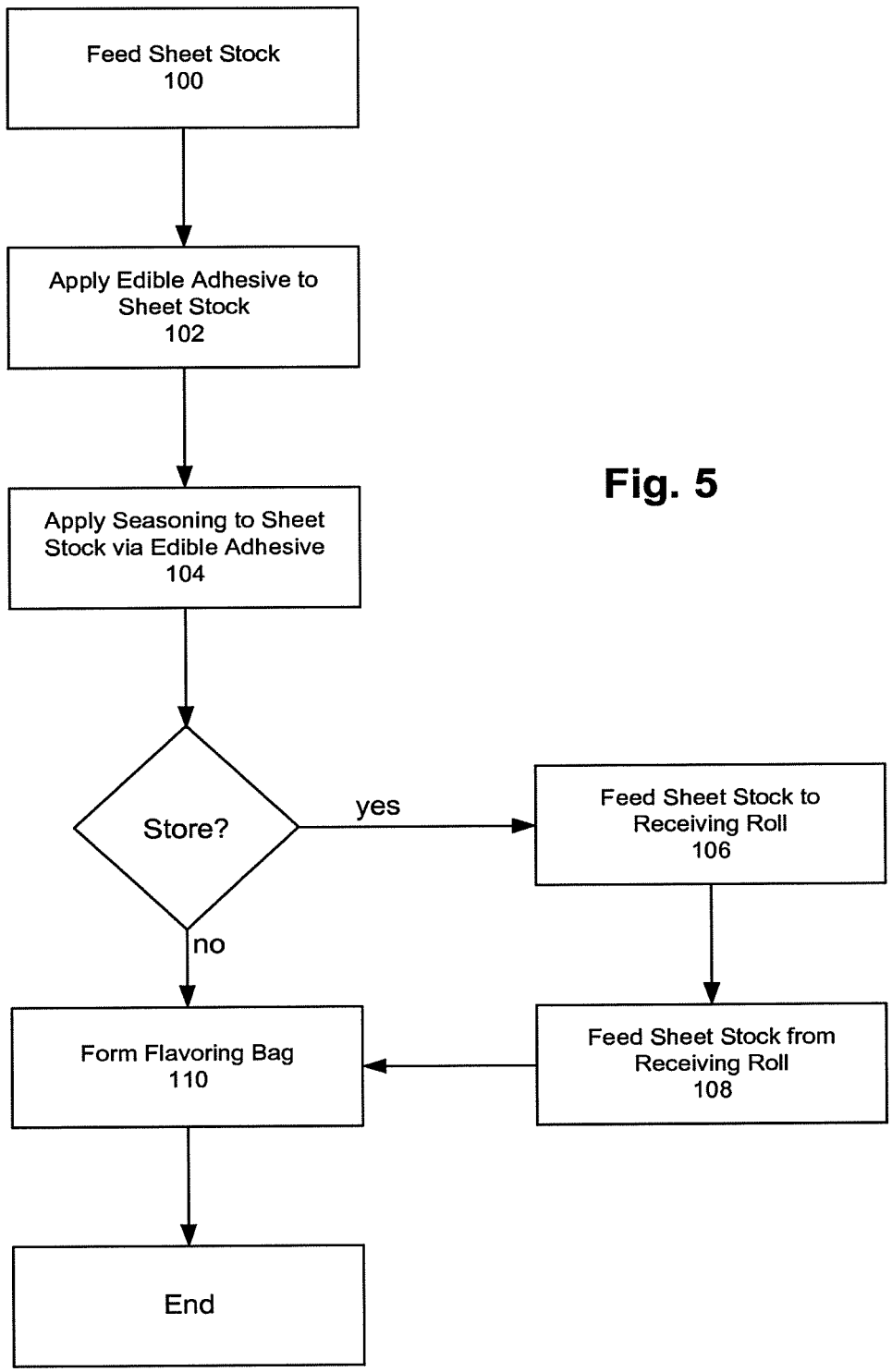
FIG. 5 is a flow chart illustrating an exemplary manufacturing process of a pre-coated bag in accordance with the subject matter of the present application.

An exemplary method of manufacturing the seasoning bag will now be described in relation to FIG. 5. At step 100, a sheet stock of film 18 is unrolled from a feed roll and fed to an application zone where an edible adhesive 20 is applied at step 102. The edible adhesive 20 may be a slurry that is sprayed, rolled, or drizzled on the sheet stock of film. At step 104, seasoning 22 is applied to the sheet stock of film 18 via the edible adhesive 20. As discussed above, the edible adhesive 20 may be combined with the seasoning 22, in which case the edible adhesive 20 and seasoning 22 will be applied simultaneously such that steps 102 and 104 are combined in a single application step.

In one embodiment, the sheet stock 18 including the edible adhesive 20 and seasoning 22 may be stored for a given period of time prior to being formed into individual seasoning bags 10. The material may be stored to promote curing of the adhesive, such as for about 1 hour to about 24 hours. In such case, the feed stock is fed to a receiving roll where it is stored at step 108. When the seasoning bags 10 are to be formed, the sheet stock is fed from the receiving roll at step 110.

When the sheet stock 18 including the edible adhesive 20 and seasoning 20 is to be immediately formed into seasoning bags 10, the sheet stock 18 is cut and formed at step 112. The same or similar process will be performed on the sheet stock 18 being fed from the receiving roll at step 110. As discussed above, in one embodiment the sheet stock 18 is folded upon itself to create a closed end portion, joined at two of the three open end portions, and cut to length. In another embodiment, the sheet stock is overlaid with and additional film sheet stocks, joined at three of the four end portions, and cut to length. The end portions of the overlying panels 12 and 14 may be joined by lap-sealing via application of heat and/or pressure, or may be joined by any other suitable means such as an adhesive.

Although the bag manufacturing process has been described in the above manner, it is to be understood that variations to the manufacturing process may be implemented. For example, the addition edible adhesive 20 and seasoning 22 may instead occur after formation of the bag. In this embodiment, the formed seasoning bag 10 may be expanded, for example, by a blast of air. Edible adhesive 20 may be sprayed into the bag 10, and seasoning 22 may subsequently be sprayed or otherwise introduced into the bag. In an embodiment where the edible adhesive 20 and seasoning 22 are combined, said combination may simply be sprayed into the bag in a single application step. As discussed above, the seasoning bag 10 may be used in various preparation and cooking applications. The following description sets forth in more detail some exemplary uses of the seasoning bag 10.

In one embodiment, seasoning bag 10 may be used for flavoring a foodstuff prior to cooking. For example, when a foodstuff is inserted into the seasoning bag 10, the foodstuff is brought into contact with the seasoning layer, and at least a portion of the seasoning, or the flavor therefrom, is transferred to the foodstuff. The foodstuff may be moistened prior to insertion into the seasoning bag 10 to aid in the transfer of the seasoning/flavor. The seasonings used in connection with the seasoning bag may be selected to impart any desired flavor to the foodstuff. Some examples of desired flavors are mesquite, lemon pepper, peppercorn, carribean jerk, buffalo, chipotle, garlic, sesame ginger, Szechuan, teriyaki, etc. When the bag is used to marinate a foodstuff, a liquid such as water may also be added to the bag, which when combined with the seasoning, may yield a liquid marinade. The bag may be closed from the atmosphere (e.g., zipped, sealed, vacuum sealed, etc.) during transfer of the seasoning/flavor. After the seasoning is applied to the foodstuff, the foodstuff may be removed from the bag and cooked or consumed.

In addition to seasoning or marinating, the seasoning bag may be used for storing a foodstuff. For example, a foodstuff that has been inserted into the seasoning bag 10 and closed from the atmosphere (e.g., zipped, sealed, vacuum sealed, etc.) may be stored for any desirable duration of time. This allows for foodstuffs that are bought in bulk to be individually packaged and seasoned in respective flavoring bags for later use. These individually packaged portions may be refrigerated or frozen, and when the foodstuff is removed from the seasoning bag, the foodstuff will possess the flavor imparted by the seasonings of the bag. The removed foodstuff may be cooked or consumed (e.g., ceviche). The storage aspect of the seasoning bag 10 makes the use of the storage bags viable for both the end-user and the manufacturer of a foodstuff. For example, a manufacturer of a foodstuff may package its foodstuffs in the seasoning bags, which are in turn sold to consumers.

In another embodiment, the seasoning bag 10 may be used as a cook-in bag. The cook-in seasoning bag allows for the seasoning included therein to impart a desired flavor to the foodstuff throughout the cooking process. For example, the seasoning bag may be used as a roasting bag, microwavable bag, slow cooker bag, and/or a boilable bag (e.g., sous vide). Upon cooking, the cook-in bag yields an essentially sterile product. The seasonings included in the bag may be entrapped in the bag during the cooking process, and in some embodiments, kept in close contact with the foodstuff throughout the duration of the cooking process. For example, when the seasoning bag 10 is used as a cook-in bag, a moistened foodstuff may be inserted into the seasoning bag and the seasoning bag may be closed from the atmosphere (e.g., zipped, sealed, vacuum sealed, etc.). The foodstuff may be cooked (e.g., roasted, microwaved, boiled, etc.) while in the seasoning bag 10. When the cooking process is complete, the seasoning bag 10 may be opened and the foodstuff may be removed (e.g., for serving).

In addition, the seasoning 22 may be used in combination with a liquid added to the seasoning bag and/or the moisture (or purge) released from the foodstuff upon cooking to yield a stock, a broth, or a sauce that may be consumed with the cooked food product. For example, the seasoning may include a dehydrated cheese that when combined with purge emitted from vegetables, forms a cheese sauce. In another example, the seasoning 22 may combine with purge emitted from turkey to form gravy. Table 1 provides an exemplary seasoning blend that may be used in the bag 10 for producing turkey gravy.

TABLE 1

Turkey Gravy

| Additive | Percentage by weight |
| --- | --- |
| Modified Corn Starch | 30-40 |
| Salt | 10-20 |
| Hydrolyzed Corn Protein | 10-20 |
| Turkey Broth | 5-10 |
| Yeast Extract | 5-10 |
| Onion Powder | 2-5 |
| Hydroxypropyl Methylcellulose | 2-5 |
| Garlic Powder | 2-5 |
| Turkey Fat | 0-2 |
| Natural Flavor | 0-2 |
| Spices | 0-2 |
| Caramel (color) | 0-2 |
| Xanthan Gum | 0-2 |
| Disodium Inosinate and Disodium Guanylate | 0-2 |
| Silicon Dioxide | 0-2 |

In another example, the seasoning of the bag may combine with purge emitted from prime rib to form au jus. Table 2 provides an exemplary seasoning blend that may be used in the bag 10 for producing roast beef au jus.

TABLE 2

Roast Beef Au Jus

| Additive | Percentage by weight |
| --- | --- |
| Modified Corn Starch | 30-40 |
| Salt | 10-20 |
| Hydrolyzed Corn Protein | 10-20 |

TABLE 2-continued

Roast Beef Au Jus

| Additive | Percentage by weight |
|---|---|
| Onion Powder | 10-20 |
| Autolyzed Yeast Extract | 5-10 |
| Beef Stock | 5-10 |
| Hydroxypropyl Methylcellulose | 2-5 |
| Caramel (color) | 2-5 |
| Spices | 0-2 |
| Garlic Powder | 0-2 |
| Rendered Beef Fat | 0-2 |
| Xanthan Gum | 0-2 |
| Corn Syrup Solids | 0-2 |
| Thiamine Hydrochloride | 0-2 |
| Disodium Inosinate and Disodium Guanylate | 0-2 |
| Natural Flavors | 0-2 |
| Silicon Dioxide | 0-2 |

In yet another embodiment, the seasoning bag may be configured to be used in combination with a slow cooker. For example, the interior volume of the slow cooker may be lined with the seasoning bag such that the open end of the seasoning bag and a portion of the bag (without the seasoning) is draped over the open end of the slow cooker. One or more foodstuffs and/or liquids may be added to the seasoning bag, the lid of the slow cooker may be placed over the open end of the seasoning bag and slow cooker, and the one or more foodstuffs may be cooked by the slow cooker in the seasoning bag.

The pre-coated seasoning bag disclosed in the present application simplifies the process of trying a new seasoning recipe by providing chef-inspired flavor combinations while eliminating the need to purchase excess quantities of specialty spices, as well as eliminating the guess work that goes into conventionally preparing the seasoning recipe. Favorite seasoning recipes are also consistent and repeatable. The one-step application process provided by the pre-coated seasoning bag yields consistent seasoning coverage of the foodstuff and a consistently flavored food product. In addition to the advantages provided throughout the preparation and cooking process, the seasoning bags of the present application provide for easy clean-up.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for manufacturing a seasoning bag, comprising:

applying an edible adhesive to a panel of a bag in a pattern of spaced apart lines; and applying a granular seasoning to the panel of the bag such that the granular seasoning adheres to the edible adhesive pattern to produce a seasoning layer having a pattern substantially the same as the edible adhesive pattern;

wherein the pattern of adhesive and granular seasoning forms air channels when the panel of the bag is vacuum sealed against a foodstuff inserted into the seasoning bag, to assist in egress of air from the bag during the vacuum sealing process.

2. The method of claim 1, wherein the edible adhesive is applied in an amount ranging from about 25 mg per square inch to about 100 mg per square inch.

3. The method of claim 1, wherein the granular seasoning is applied in an amount ranging from about 25 mg per square inch to about 450 mg per square inch.

4. The method of claim 1 wherein the thickness of the edible adhesive ranges from about 3 mil to about 18 mil and the thickness of the seasoning ranges from about 3 mil to about 18 mil.

5. The method of claim 1, wherein the granular seasoning is configured to form a liquid marinate when combined with water added to the seasoning bag.

6. The method of claim 1, wherein the granular seasoning is configured to form a broth when combined with water added to the seasoning bag.

7. The method of claim 1, wherein the granular seasoning is configured to form a sauce when combined with water added to the seasoning bag.

8. The method of claim 1 wherein the bag is vacuum sealable.

9. The method of claim 1 wherein the bag is at least one of an ovenable bag, a bailable bag, a slow cooking bag, or a microwavable bag.

10. The method of claim 1, wherein the granular seasoning includes at least one of a coloring additive, a nutrient, an antimicrobial additive, and a preservative.

11. The method of claim 1, wherein the pattern of spaced apart lines is arranged to resemble grill marks.

12. The method of claim 1, wherein the pattern of spaced apart lines comprises a plurality of parallel straight lines.

13. The method of claim 1, further comprising sealing the panel with a second bag panel to form the seasoning bag.

14. The method of claim 1, further comprising feeding the panel from a feed roll to an application zone, wherein the edible adhesive is applied to the panel in the application zone.

15. The method of claim 14, further comprising feeding the panel to a receiving roll for storage, and subsequently feeding the panel from the receiving roll and sealing the panel with a second bag panel to form the seasoning bag.

16. A seasoning bag comprising:

a panel;

an edible adhesive applied to the panel in a pattern of spaced apart lines; and a granular seasoning adhered to the edible adhesive pattern to produce a seasoning layer having a pattern substantially the same as the edible adhesive pattern;

wherein the pattern of adhesive and granular seasoning forms air channels when the panel of the bag is vacuum sealed against a foodstuff inserted into the seasoning bag, to assist in egress of air from the bag during the vacuum sealing process.

17. A method of packaging a foodstuff, the method comprising:

providing a seasoning bag including a panel, an edible adhesive applied to the panel in a pattern of spaced apart lines, and a granular seasoning adhered to the edible adhesive pattern to produce a seasoning layer having a pattern substantially the same as the edible adhesive pattern;

inserting the foodstuff into the bag;

vacuum sealing the panel against the foodstuff, wherein the pattern of adhesive and granular seasoning forms air channels to assist in egress of air from the bag during the vacuum sealing process.

* * * * *